US010303256B2

(12) United States Patent
Burckard

(10) Patent No.: US 10,303,256 B2
(45) Date of Patent: *May 28, 2019

(54) APPLICATION SWAP BASED ON SMART DEVICE MOVEMENT

(71) Applicant: Nagravision S.A., Cheseaux-sur-Lausanne (CH)

(72) Inventor: Antoine Burckard, Montigny-le-Bretonneux (FR)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/254,887

(22) Filed: Sep. 1, 2016

(65) Prior Publication Data
US 2016/0370872 A1    Dec. 22, 2016

Related U.S. Application Data

(63) Continuation of application No. 14/321,880, filed on Jul. 2, 2014, now Pat. No. 9,465,445.

(51) Int. Cl.
| G06K 7/08 | (2006.01) |
| G06K 19/06 | (2006.01) |
| G06F 3/01 | (2006.01) |
| G09G 3/36 | (2006.01) |
| G06F 3/044 | (2006.01) |
| G06F 3/045 | (2006.01) |
| G06F 3/0488 | (2013.01) |
| G06F 3/0484 | (2013.01) |
| G06F 3/0482 | (2013.01) |
| G06F 3/0487 | (2013.01) |
| G06F 1/16 | (2006.01) |
| G06F 3/0346 | (2013.01) |

(52) U.S. Cl.
CPC ............ *G06F 3/017* (2013.01); *G06F 1/1694* (2013.01); *G06F 3/0346* (2013.01); *G06F 3/044* (2013.01); *G06F 3/045* (2013.01); *G06F 3/0482* (2013.01); *G06F 3/0484* (2013.01); *G06F 3/0487* (2013.01); *G06F 3/04842* (2013.01); *G06F 3/04883* (2013.01); *G09G 3/36* (2013.01); *G06F 2203/04808* (2013.01); *G09G 2340/0464* (2013.01); *G09G 2340/0492* (2013.01); *G09G 2354/00* (2013.01)

(58) Field of Classification Search
USPC .......................................... 235/451, 492, 380
See application file for complete search history.

(56) References Cited

U.S. PATENT DOCUMENTS

| 6,573,883 B1 | 6/2003 | Bartlett |
| 8,228,292 B1 | 7/2012 | Ruiz et al. |
| 8,942,764 B2 | 1/2015 | Culbert et al. |

(Continued)

OTHER PUBLICATIONS

"U.S. Appl. No. 14/321,880, Examiner Interview Summary dated Aug. 6, 2015", 3 pgs.

(Continued)

*Primary Examiner* — Tuyen K Vo
(74) *Attorney, Agent, or Firm* — Schwegman Lundberg & Woessner, P.A.

(57) ABSTRACT

A smart device capable of switching between at least two applications based on the position of the smart device and a method of doing the same is provided.

18 Claims, 4 Drawing Sheets

(56) References Cited

U.S. PATENT DOCUMENTS

| | | | |
|---|---|---|---|
| 9,477,313 | B2 | 10/2016 | Mistry et al. |
| 2008/0254822 | A1* | 10/2008 | Tilley .................. G06F 1/1626 455/550.1 |
| 2009/0088204 | A1* | 4/2009 | Culbert .................. G06F 3/017 455/556.1 |
| 2009/0262074 | A1 | 10/2009 | Nasiri et al. |
| 2009/0303204 | A1* | 12/2009 | Nasiri .................. A63F 13/06 345/184 |
| 2013/0076659 | A1 | 3/2013 | Miyaji |
| 2013/0250048 | A1* | 9/2013 | Aller ................. H04N 5/23238 348/37 |
| 2014/0192088 | A1* | 7/2014 | Lonikar ............... G06F 3/0346 345/649 |
| 2015/0082181 | A1 | 3/2015 | Ames et al. |
| 2015/0378520 | A1* | 12/2015 | Chandrasekaran ... G06F 3/0482 715/716 |
| 2016/0004314 | A1 | 1/2016 | Burckard |

OTHER PUBLICATIONS

"U.S. Appl. No. 14/321,880, Final Office Action dated Sep. 22, 2015", 8 pgs.
"U.S. Appl. No. 14/321,880, Non Final Office Action dated Feb. 25, 2016", 9 pgs.
"U.S. Appl. No. 14/321,880, Non Final Office Action dated May 12, 2015", 8 pgs.
"U.S. Appl. No. 14/321,880, Notice of Allowance dated Jun. 17, 2016", 7 pgs.
"U.S. Appl. No. 14/321,880, Preliminary Amendment filed Jul. 23, 2014", 6 pgs.
"U.S. Appl. No. 14/321,880, Response filed May 24, 2016 to Non Final Office Action dated Feb. 25, 2016", 10 pgs.
"U.S. Appl. No. 14/321,880, Response filed Aug. 7, 2015 to Non Final Office Action dated May 12, 2015", 13 pgs.
"International Application Serial No. PCT/EP2015/065083, International Search Report dated Oct. 8, 2015", 3 pgs.
"International Application Serial No. PCT/EP2015/065083, Written Opinion dated Oct. 8, 2015", 6 pgs.
"Mexican Application Serial No. MX a 2016 017287, Office Action dated Sep. 5, 2018", (w English Translation), 6 pages.
"Mexican Application Serial No. MX/a/2016/017287, Response filed Oct. 31, 2018 to Office Action dated Sep. 5, 2018", (w/English Translation), 16 pgs.
Betters, Elyse, "Here's what the new Android Wear wrist gestures can do", [Online]. Retrieved from the Internet: <https://www.pocket-lint.com/smartwatches/news/135915-here-s-what-the-new-android-wear-wrist-gestures-can-do>, (Nov. 14, 2015), 4 pgs.

* cited by examiner

APPLICATION SWAP BASED ON SMART DEVICE MOVEMENT

RELATED APPLICATIONS

This application is a Continuation of U.S. patent application Ser. No. 14/321,880, filed Jul. 2, 2014, which is incorporated herein by reference in its entirety.

FIELD OF THE DISCLOSURE

The present disclosure relates generally to a smart device capable of switching between at least two applications based on the position of the smart device and a method of doing the same.

BACKGROUND OF THE DISCLOSURE

Smart devices such as smart phones, tablets, and other portable handheld electronic devices have revolutionized the world by connecting individuals to one another instantaneously with the touch of a hand. Smart devices have also enabled applications for different features of the device to be accessible everywhere. Such applications include music, e-mail, text messaging, alarm clocks, compasses, games, notes, GPS, etc.

However, smart devices have certain limitations that conventional non-handheld devices do not have. For example, a user may desire to access multiple applications at a given time. Currently, smart devices may only display one application at a time and do not allow a split screen view, allow for viewing multiple applications at a time, or switching between applications quickly. To switch between multiple applications, the user has to physically operate the device and touch the screen and/or a plurality of buttons to access a first application and then touch the screen or buttons again to access a second application. Unlike the smart device predecessor, laptops or desktop computers each have the ability to allow a user to enable a split screen between two documents or programs, can view multiple documents or programs at the same time, and can switch between multiple documents or programs easily with one click of a mouse.

Thus, there is a need for a smart device capable of switching between at least two applications easily without touching multiple buttons and/or a touch screen.

SUMMARY OF THE DISCLOSURE

A smart device capable of switching between at least two applications based on the position of the smart device in a three-dimensional space and a method of switching between at least two applications on a smart device based on the position of the smart device within a three-dimensional space is provided. The smart device can generally include a controller, a user interface, and at least one sensing device are provided.

An aspect of the present disclosure includes a smart device capable of switching between at least two applications based on the position of the smart device in a three-dimensional space having a first application and a second application different from the first application. The second application may be actively running in the background of the smart device. A user interface can display the first application and a controller can be communicatively connected to the user interface. The smart device can further include at least one sensing device communicatively connected to the controller. The at least one sensing device may be configured to detect at least one of an orientation and a flicking motion of the smart device in the three-dimensional space. Additionally, the first application may be associated with one of a first orientation and a first flicking motion within the three-dimensional space, the second application is associated with one of a second orientation and a second flicking motion within the three-dimensional space, and the controller can be configured to switch from the first application to the second application running in the background of the smart device when the at least one sensing device detects one of the second orientation and the second flicking motion associated with the second application.

Another aspect of the present disclosure includes a smart device capable of switching between at least two applications based on the orientation of the smart device in a three-dimensional space having at least two applications actively running in the background of the smart device, a user interface for displaying the at least two applications, a controller communicatively connected to the user interface, and at least one sensing device communicatively connected to the controller. The at least one controller may be configured to detect at least one of an orientation and a flicking motion of the smart device in the three-dimensional space. Additionally, the at least two applications can include a first application associated with one of a first orientation and a first flicking motion within the three-dimensional space, a second application may be associated with one of a second orientation and a second flicking motion within the three-dimensional space. A controller may be configured to activate the first application and display the first application on the user interface when the at least one sensing device detects one of the first orientation and first flicking motion associated with the first application and the controller may be configured to switch from the first application and activate and display the second application when the at least one sensing device detects one of the second orientation and the second flicking motion associated with the second application.

An aspect of the method of switching between at least two applications on a smart device based on the orientation of the smart device within a three-dimensional space where the smart device includes a controller, a user interface, and at least one sensing device includes providing at least two applications is also provided. The at least two applications being a first application and a second application. The first application being associated with at least one of a first orientation and a first flicking motion within the three-dimensional space of the smart device. The second application being associated with one of a second orientation and a second flicking motion within the three-dimensional space of the smart device. The method further includes activating the first application, displaying the first application on the user interface, and detecting one of the second orientation and the second flicking motion in the three-dimensional space of the smart device via the at least one sensing device. After one of the second orientation and the second flicking motion may be detected, the second application can be activated and the second application is displayed on the user interface.

The aspects disclosed herein provide various advantages. For example, applications may be accessed easily without operation or use of a touch screen and/or multiple buttons. Additionally, applications may be accessed quickly with just the rotation of the smart device.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE PRESENT DISCLOSURE

Detailed examples of the present disclosure are disclosed herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects of the present disclosure provide a smart device capable of switching between at least two applications based on the position of the smart device in a three-dimensional axis or space and a method of switching between at least two applications based on the position of the smart device in a three-dimensional axis or space.

As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 1:
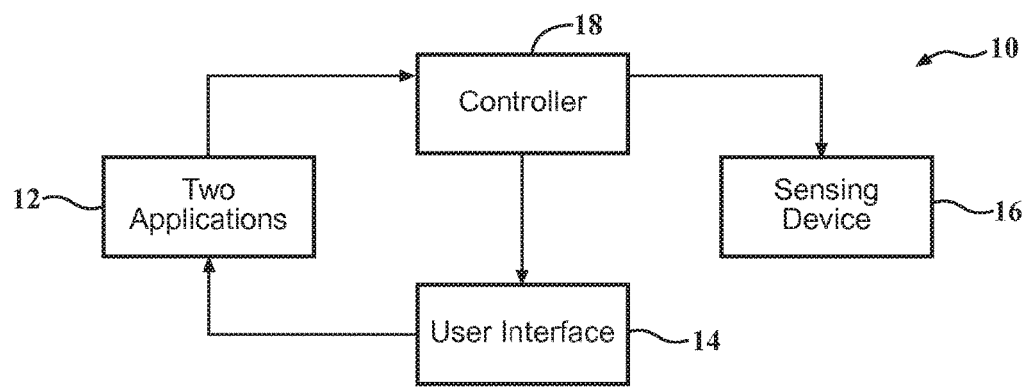
FIG. 1 is a block diagram of a smart device capable of switching between at least two applications based on the position of the smart device within a three-dimensional space in accordance with an aspect of the present disclosure.

FIG. 1 is a block diagram of a smart device 10 capable of switching between at least two applications 12 based on the position of the smart device 10 within a three-dimensional space in accordance with the present disclosure. The smart device 10 may be a smart phone, tablet, personal digital assistant (PDA), smart watches, smart glasses or any other portable handheld device. The smart device 10 can include at least two applications 12 or more. One or more of the at least two applications 12 may be actively running in the background of the smart device 10. To be actively running in the background of the smart device 10, one or more of the at least two applications 12 may have been previously activated or selected by the user, In other words, the at least two applications 12 may be in a sleep state. For example, on smart phones such as an IPhone®, actively running applications may be viewed by pressing the button below the touch screen twice. The at least two applications 12 may be a first application and a second application different from the first application. In one embodiment, the first application may not be actively running in the background of the smart device 10. While in another embodiment, the first and second application may be actively running in the background of the smart device 10. Additionally, the at least two applications 12 may include a third, fourth, fifth, and sixth application or more.

The smart device 10 may also include a user interface 14 for displaying the at least two applications 12 such as the first application. The user interface 12 can be configured to recognize and activate commands entered by the user. The user interface 12 may be a liquid crystal display (LCD) screen, a capacitive screen, a resistive screen, or another type of touch screen. The user interface 14 may also have at least one button for selecting various features on the smart device 10. Instead of a single button, a plurality of buttons may be employed.

FIG. 1 also shows at least one sensing device 16 capable of detecting at least one of an orientation and a flicking motion of the smart device 10 in a three-dimensional axis or space (shown in FIGS. 2A-2B) The three-dimensional axis or space may include a positive and negative X-axis, a positive and negative Y-axis, and/or a positive and negative Z-axis. In other words, the at least one sensing device 16 can detect the orientation of the smart device 10 relative to the XYZ axes. The at least one sensing device 16 may also detect a flicking motion relative to the XYZ axes. Alternatively, at least one sensing device may include a first sensing device to detect the orientation of the smart device 10 relative to each of the XYZ axes and a second sensing device to detect the flicking motion direction or position of orientation in which the smart device 10 is detected in.

According to an aspect, the at least one sensing device 16 may be a gyroscope, which measures orientation or flicking motion of a device based on the angular momentum of the device. According to another aspect, the at least one sensing device may be an accelerometer, which senses orientation or flicking motion of a device based on weight change or weight shift of the device. According to a further aspect, the at least one sensing device 16 may be a first and a second sensing device. For example, the smart device 10 may have a gyroscope and an accelerator used to measure the orientation of the smart device relative to the three-dimensional axis. It should be noted that one skilled in the art will appreciate that the at least one sensing device 16 may be a position sensor capable of measuring the orientation of the smart device within a three-dimensional axis that is not a gyroscope or an accelerometer. Other suitable device for sensing orientation and movement may also be employed.

The smart device 10 further includes a controller 18 communicatively connected to the user interface 14 and the at least one sensing device 16. The controller 18 may be configured to control and operate commands provided by the user interface 14 and the at least one sensing device 16. More specifically, the controller 18 can perform commands entered through the user interface 14, execute such commands, and also control the content displayed by the smart device 10 on the user interface 14. The controller 18 may also be configured to receive signals or information from the at least one sensing device 16 and performs, controls, executes operations in response to the signal or information received.

Additionally, the controller 18 may have memory for storing the at least two applications 12 on the smart device 10. Such memory may be any combination of memory such as random-access memory (RAM) and/or read-only memory (ROM), processing resources or a microcontroller or central processing unit (CPU) or hardware or software control logical to enable management of the controller 18. The controller 18 may include one or more wireless, wired, or any combination thereof communication ports to communicate with external resources as well as various input and output (I/O) devices. The controller 18 may associate each of the at least two applications 12 with one of an orientation and a flicking motion within the three-dimensional axis. For example, a navigation/GPS application may be associated with the positive X axis while a text messaging application may be associated with the positive Y axis. In another example, there may be a plurality of actively running applications on a smart device at a time and in an order respect to which each was activated or selected by the user. The order of applications may correspond to the position and orientation of the three-dimensional axis.

The controller 18 may be configured to associate the first application with at least one of a first orientation and a first flicking motion within the three-dimensional space and the second application with at least one of a second orientation and a second flicking motion within the three dimensional space. The controller 18 may be also configured to switch from the first application to the second application running in the background of the smart device in response to the at least one sensing device 16 detects one of the second orientation and the second flicking motion associated with the second application. Additionally, the controller 18 may be configured to switch from the first application to the second application when the at least one sensing device 16 detects the second flicking motion after the second orientation is detected or the controller 18 may be configured to switch from the first application to the second application when the at least one sensing device 16 detects the second orientation after the second flicking motion is detected. In other words, the smart device 10 may be rotated and/or flicked towards a particular axis or orientation of the three-dimensional axis which alert the smart device 10 of the user's desire to switch between two applications and when the flicking motion and/or orientation or rotation is detected by the sensing device 16 the smart device 10 can select or activate the application associated with that specific orientation and displays such application on the user interface 14.

The controller 18 of FIG. 1 may also be configured to switch from the second application to the third application associated with one of a third orientation and a third flicking motion within the three-dimensional space when the at least one sensing device 16 detects one of the third orientation and the third flicking motion within the three-dimensional space of smart device 10. The controller 18 may further be configured to activate a programming mode for associating the at least two applications with a particular orientation in the three-dimensional space. The programming mode will be further described below in FIG. 5.

Figure 2A:
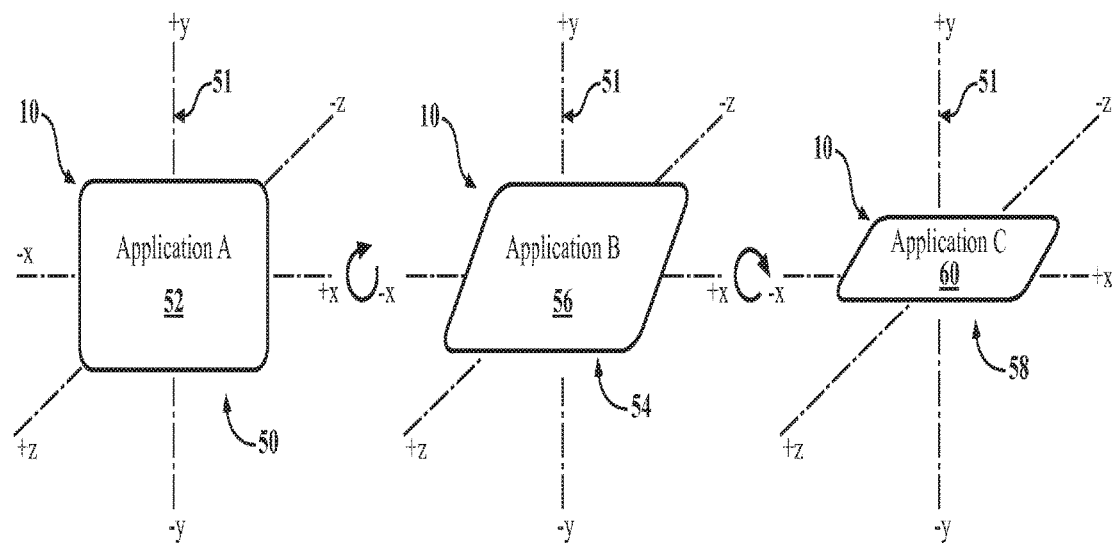
FIGS. 2A-B are illustrations of a smart device switching between at least two applications based on the position of the smart device within a three-dimensional space in accordance with various aspects of the present disclosure.
Figure 2B:
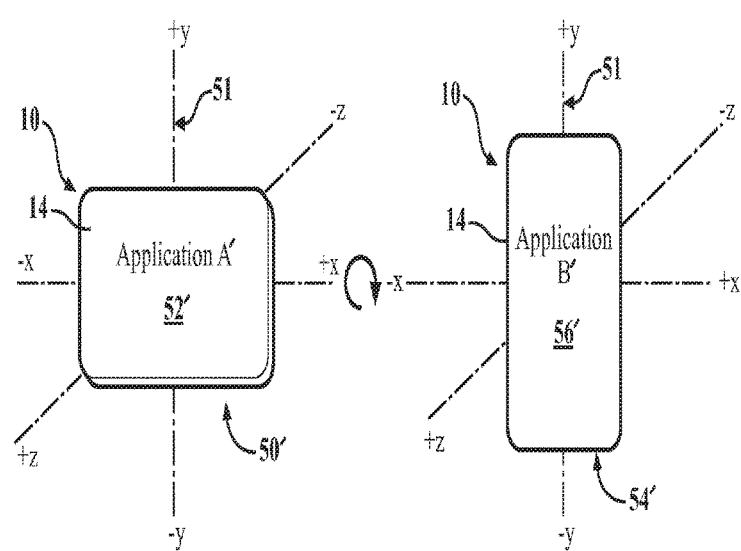

With respect to FIGS. 2A-B, illustrations of a smart device 10 switching between at least two applications 12 in accordance with the present disclosure are provided. In particular, FIG. 2A shows the smart device 10 in a first position 50 associated with application A (generally identified by reference number 52), a second position 54 associated with application B (generally identified by reference number 56), and a third position 58 associated with application C (generally identified by reference number 60) in the three-dimensional space +X, −X, +Y, −Y, +Z and −Z 51 or otherwise known as pitch, roll, and yaw. FIG. 2B shows the smart device 10 in a first position 52' in the Y-direction rotated 90 degrees to a second position 54' in the X-direction. According to an aspect, when the smart device 10 is rotated from the first position 50' to the second position 54', the controller 18 switches from application A' 52' to application B' 56' which is displayed on the user interface 14.

Figure 3:
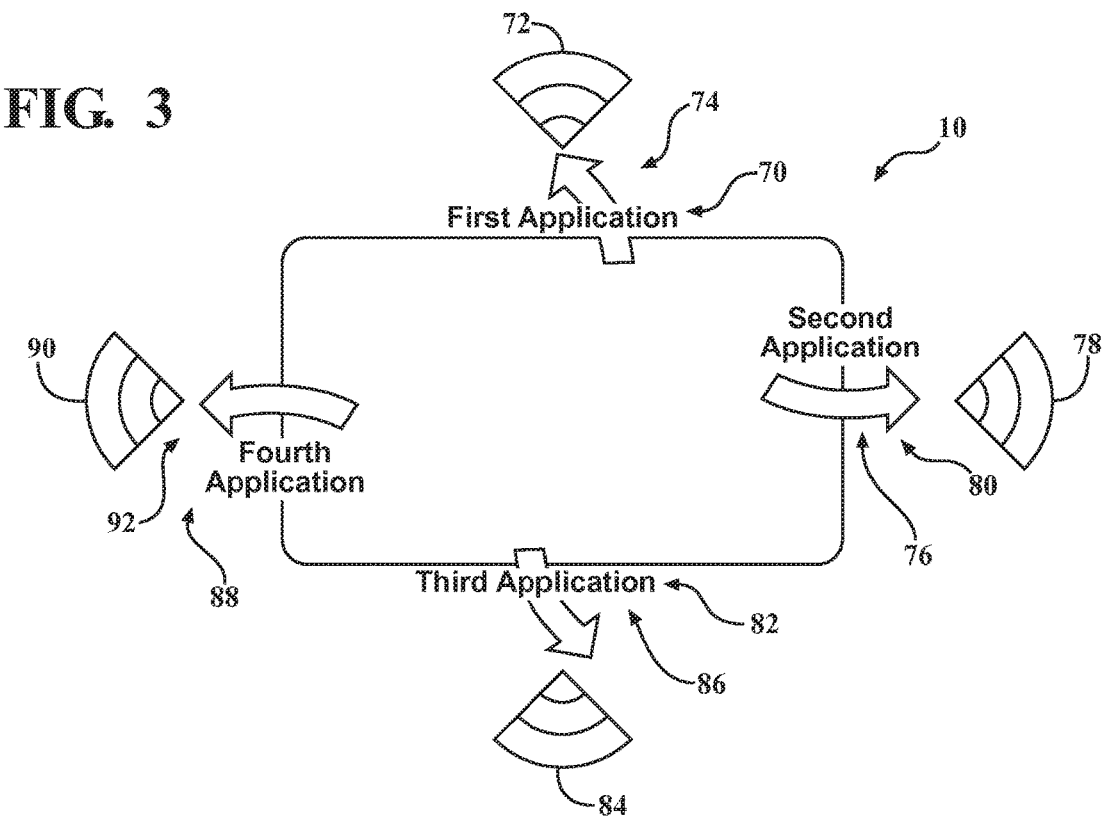
FIG. 3 is an illustration of a smart device switching between at least two applications based on the position of the smart device within a three-dimensional space in accordance with an aspect of the present disclosure.

With respect to FIG. 3, an illustration of a smart device 10 switching between at least two applications 12 in accordance with the present disclosure is provided. Specifically, FIG. 3 shows rotating the smart device 10 in a predetermined orientation such as the first orientation, second orientation and so on of the three-dimensional axis and then flicking the smart device 10 in that predetermined orientation to select and display the chosen application. In other words, the smart device 10 may be rotated to a first position 70 and flicked in a first direction 72 to activate a first application 74, rotated to a second position 76 and flicked in a second direction 78 to activate a second application 80, rotated to a third position 82 and flicked in a third direction 84 to activate a third application 86, and rotated to a fourth position 88 and flicked in a fourth direction 90 to activate a fourth application 92 or vice versa i.e. flicked in a first direction 72 and then rotated in to a first position 70 to activate a first application 74 and so on. Additionally, one skilled in the art appreciates that the smart device 10 does not require rotation but instead may only be flicked a first direction 72 to activate a first application 74, flicked in a second direction 78 to switch from the first application 74 and activate the second application 80, flicked in a third direction 84 to activate the third application 86, and flicked in a fourth direction 90 to activate a fourth application 92. One skilled in the art will further appreciate that flicking may be characterized by jerking, shaking, or tilting the smart device 10 quickly in the predetermined direction similar to the motion experienced by a Wii Remote Controller. One skilled in the art will also appreciate that the examples described above with respect to FIGS. 2A-3 are merely exemplary and does not describe all possible forms, examples, or embodiments of rotating the smart device to switch from one application to another.

Figure 4:
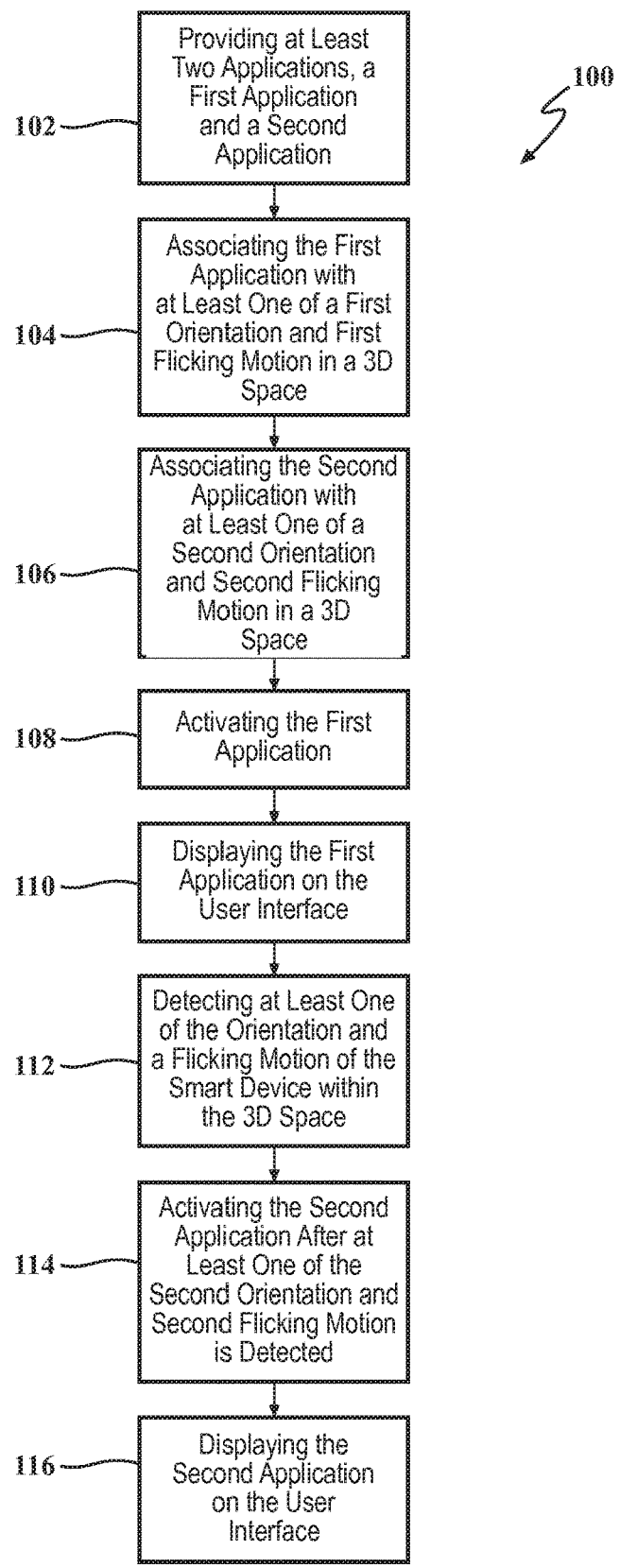
FIG. 4 is a flowchart of a method for switching between at least two applications on a smart device based on the position of the smart device within a three-dimensional space in accordance with an aspect of the present disclosure.

FIG. 4 is a flowchart of a method for switching between at least two applications on a smart device based on the position within a three-dimensional space of the smart device, the smart device having a controller, a user interface, and at least one sensing device 100 in accordance with the present disclosure. The method includes providing at least two application, for example, the at least two applications may be a first application and a second application 102. The at least two applications may also include a third application, a fourth application, a fifth application, and a sixth application or more. The first application may be associated with at least one of a first orientation and a first flicking motion within the three-dimensional space 104. While the second application may be associated with at least one of a second orientation and a second flicking motion within the three-dimensional space 106. One skilled in art appreciates that the three-dimensional space provides for at least six orientations, including a positive and a negative X-axis (pitch), Y-axis (roll), and Z-axis (yaw) as described above and as shown in FIGS. 2A-3. As such, there may be a minimum of two applications for each axis.

The method may also include activating the first application 108. The first application may or may not be running in the background of the smart device. Additionally, the first application may be activated by the user interface or may be activated after the at least one sensing device detects the smart device within one of the first orientation and the first flicking motion associated with the first application of the three-dimensional space. According to an aspect, after the first application is activated 108, the first application may be displayed on the user interface 110. The method can further include detecting at least one of an orientation and a flicking motion of the smart device in the three-dimensional space via the at least one sensing device 112. This may also include determining the direction of orientation or flicking motion. After this is detected as generally indicated by reference number 112, the associated application may be activated 114 and displayed on the user interface 116. For example, if one of the second orientation and flicking motion is detected by the at least one sensing device, the second application may be activated and displayed on the user interface.

Figure 5:
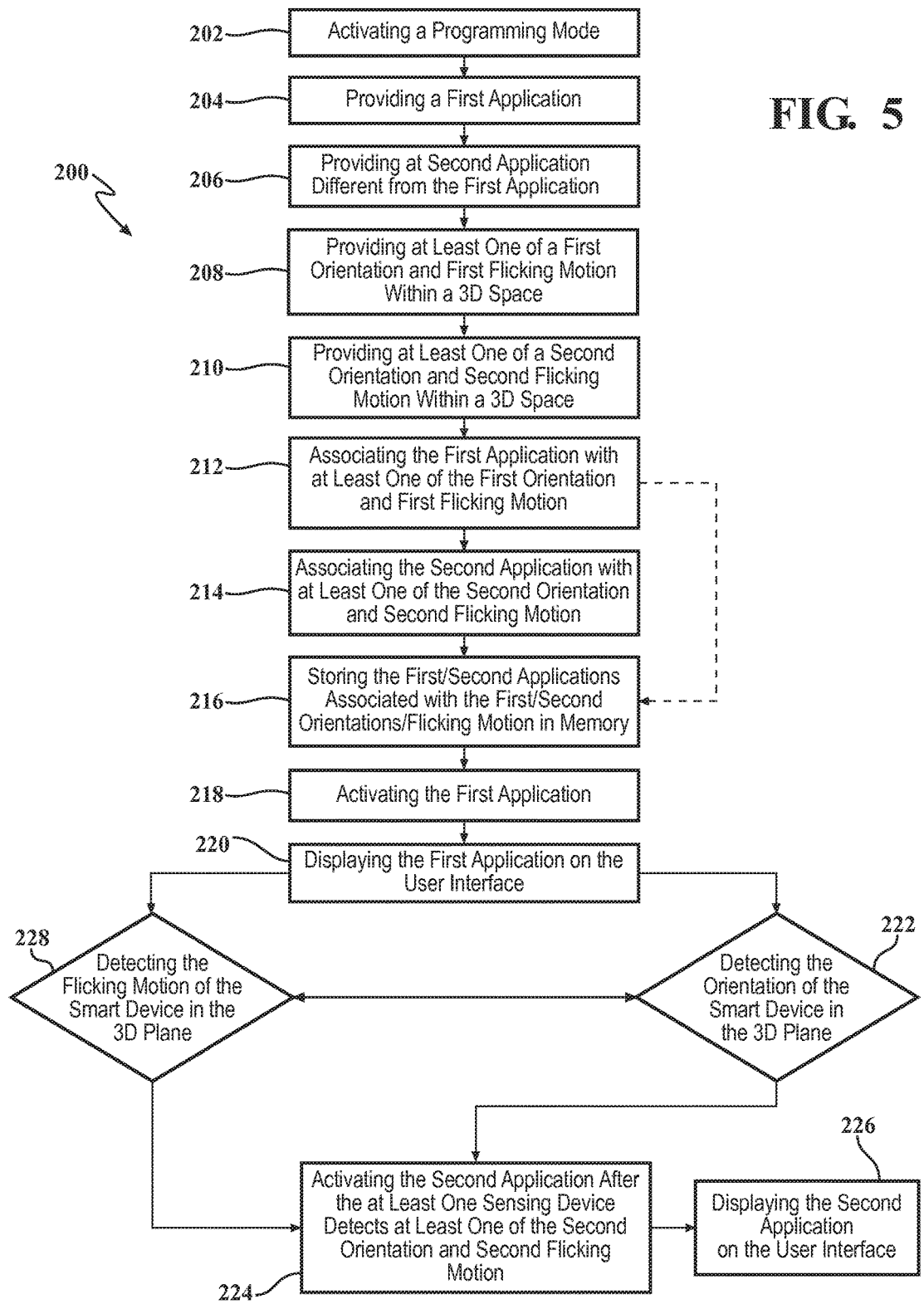
FIG. 5 is another flowchart of a method for switching between at least two applications on a smart device based on the position of the smart device within a three-dimensional space in accordance with an aspect of the present disclosure.

FIG. 5 is another flowchart of a method for switching between at least two applications on a smart device based on the position within a three-dimensional space of the smart device, the smart device having a controller, a user interface, and at least one sensing device 200 in accordance with the present disclosure. More specifically, FIG. 5 is a more detailed flowchart of FIG. 4. The method of FIG. 5 includes activating a programming mode for associating the first application with one of a first orientation and a first flicking motion and for associating the second application with one of a second orientation and a second flicking motion within the three-dimensional space via the controller 202. In activating the programming mode 202, a first application is provided 204 and a second application running in the background of the smart device is also provided 206. Additionally, a first orientation within the three-dimensional space is provided 208 as well as a second orientation within the three-dimensional space is provided 210. According to an aspect, the method further can include associating the first application with at least one of the first orientation and the first flicking motion within the three-dimensional space 212 and associating the second application with at least one of the second orientation and the second flicking motion within the three-dimensional space 214. This will then be stored in memory 216. One skilled in the art will appreciate that associating the first application with the first orientation may be stored in memory immediately or may be stored in memory after other applications such as the second application is associated with the second orientation within the three-dimensional space and so on.

After the applications are associated with each respective orientation and/or flicking motion and stored in memory, the first application may be activated as generally indicated by reference number 218 and displayed as generally indicated by reference number 220 on the user interface. The first application may be activated manually through the user interface or may be activated after the at least one sensor detects the first orientation and/or first flicking motion within the three-dimensional space of the smart device. After the first application is displayed 220, a user may desire to activate and use another application such as the second application. According to an aspect, when the user rotates the smart device to the second orientation, the at least one sensing device can detect the orientation of the smart device 222 and activate 224 and display the second application 60 associated with the second orientation within the three-dimensional space on the user interface 226. Alternatively, the at least one sensing device may detect the flicking motion of the smart device 228 which can activate and display the second application associated with the second flicking motion within the three-dimensional space on the user interface 226. Additionally, the at least one sensing device may detect a flicking motion 228 after detecting an orientation 222 which can activate 224 and display the second application associated with the second orientation within the three-dimensional space on the user interface 226 or vice versa.

According to a further aspect, after the second application is displayed 226, the at least one sensing device may continue to detect if the smart device is within another orientation or if the smart device experiences another flicking motion associated with another application and so on which would then be activated and displayed on the user interface of the smart device. For example, a third application associated with a third orientation, a fourth application associated with a fourth orientation, and so on.

Furthermore, one skilled in the art appreciates that the order of applications associated orientation and flicking motion as described above is not limited and may be preprogrammed by a developer, programmed by the user, or may not be programmed at all. But instead the first application may be associated with a first orientation or first flicking motion based on ascending or descending order of applications shown on the smart device and based on the ascending or descending order of the XYZ axis. For instance, if the applications provided on the smart device are in this order: 1) text messaging, 2) GPS, and 3) e-mail, then text messaging application will be associated with first orientation or first flicking motion, i.e. the positive X-axis, the GPS application will be associated with the second orientation or second flicking motion i.e. the positive Y-axis, and the e-mail application will be associated with the third orientation or third flicking motion i.e. the positive Z-axis. Additionally, one skilled in the art will appreciate the capability of switching between applications based on the orientation or flicking motion of the smart device may be standard on the smart device with downloadable software updates or may be a separate downloadable application having software updates as needed.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

The invention claimed is:

1. A device comprising:
   a first application;
   a second application different from the first application;
   a user interface configured to display the first application;
   a controller communicatively connected to the user interface, the controller having memory for storing the first application and the second application on the device; and
   at least one sensing device communicatively connected to the controller, the at least one sensing device being configured to detect user actions related to movement of the device,
   the controller being configured to cause the user interface to switch from displaying the first application to displaying the second application in response to the at least one sensing device detecting both an initial motion of the device and a subsequent motion of the device after the initial motion is detected.

2. The device of claim 1, wherein:
the initial motion of the device includes one of a flicking motion or a rotation; and
the subsequent motion includes one of a flicking motion or a rotation.

3. The device of claim 2, wherein the rotation causes the device to be in a particular orientation.

4. The device of claim 1, wherein:
the initial motion is a first motion;
the subsequent motion is a second motion; and
the controller is further configured to associate the first application with at least one of a third motion and a fourth motion and to associate the second application with the initial action and the subsequent action.

5. The device of claim 4, wherein the controller is configured to activate a programming mode for associating the first application with the third motion and the fourth motion and for associating the second application with the initial motion and the subsequent motion.

6. The device of claim 1, wherein the at least one sensing device is configured to detect the user actions related to movement of the device based on at least one of a weight change or a weight shift of the device.

7. The device of claim 1, wherein:
the initial motion is a first motion;
the subsequent motion is a second motion; and
the device further comprises a third application different from the second application, wherein the third application is associated with at least one of a third motion and a fourth motion and wherein the controller is configured to cause the user interface to switch from displaying the second application to displaying the third application in response to the at least one sensing device detecting one of the motion action and motion action.

8. The device of claim 7, wherein the third application is running in the background of the device.

9. The device of claim 7, wherein the third application is activated in response to the at least one sensing device detecting one of the third motion and fourth motion.

10. A method of &witching between at least two applications on a device within a three-dimensional space, the device having a controller, a user interface, and at least one sensing device, the method comprising:
providing at least two applications, the at least two include a first application and a second application;
activating the first application;
displaying the first application on the user interface;
detecting an initial motion of the device via the at least one sensing device;
detecting a subsequent motion of the device after detecting the initial motion via the at least one sensing device; and
in response to detecting the subsequent motion after detecting the initial motion;
activating the second application; and
displaying the second application on the user interface.

11. The device of claim 10, wherein:
the initial motion of the device includes one of a flicking motion or a rotation; and
the subsequent motion causes the device to be in a particular orientation.

12. The method of claim 10, wherein the second application is running in the background of the device.

13. The method of claim 10, wherein:
the initial motion is a first motion;
the subsequent motion is a second motion; and
the method further comprises:
activating a programming mode for associating the first application with a third otion and a fourth motion and the second application with the initial motion and the subsequent motion via the controller.

14. The method of claim 13, further including:
storing the first application associated with the third motion and the fourth motion and the second application associated with the initial motion and the subsequent motion in memory of the controller.

15. The method of claim 14, wherein the at least two application includes a third application associated with at least one of a fifth motion and sixth motion of the device.

16. The method of claim 15, further including:
detecting one of the fifth motion and the sixth motion via the at least one sensing device;
activating the third application in response to the at least one sensing device detecting one of the fifth motion and the sixth motion; and
displaying the third application on user interface.

17. A system comprising:
at least two applications;
a controller; and
at least one sensing device communicatively connected to the controller, the at least one sensing device being configured to detect movement of a device in a three-dimensional space,
the at least two applications including a first application associated with at least one of a first movement of the device and a second movement of the device within the three-dimensional space and a second application associated with at least one of a third movement of the device and a fourth movement of the device within the three-dimensional space, and
the controller being configured to activate the first application in response to the at least one sensing device detecting the first movement of the device before detecting the second movement of the device associated with the first application, the controller being further configured to switch from the first application and to activate the second application in response to the at least one sensing device detecting the third movement of the device and detecting the fourth movement of the device after the third movement is detected.

18. The system of claim 17, wherein the at least two applications include a third application associated with at least one of a fifth movement and a sixth movement of the device within the three-dimensional space and wherein the controller is configured to switch from the second application and to activate the third application in response to the at least one sensing device detecting one of the fifth movement and the sixth movement associated with the third application.

* * * * *

UNITED STATES PATENT AND TRADEMARK OFFICE
CERTIFICATE OF CORRECTION

PATENT NO. : 10,303,256 B2
APPLICATION NO. : 15/254887
DATED : May 28, 2019
INVENTOR(S) : Antoine Burckard It is certified that error appears in the above-identified patent and that said Letters Patent is hereby corrected as shown below:

In the Claims

In Column 9, Line 42, in Claim 10, delete "&witching" and insert --switching-- therefor In Column 10, Line 10, in Claim 13, delete "otion" and insert --motion-- therefor Signed and Sealed this
Eighth Day of December, 2020

Andrei Iancu
*Director of the United States Patent and Trademark Office*